United States Patent
Caraccio et al.

(10) Patent No.: US 11,030,122 B2
(45) Date of Patent: Jun. 8, 2021

(54) APPARATUSES AND METHODS FOR SECURING AN ACCESS PROTECTION SCHEME

(71) Applicant: Micron Technology, Inc., Boise, ID (US)

(72) Inventors: Danilo Caraccio, Buonalbergo (IT); Graziano Mirichigni, Vimercate (IT)

(73) Assignee: Micron Technology, Inc., Boise, ID (US)

( * ) Notice: Subject to any disclaimer, the term of this patent is extended or adjusted under 35 U.S.C. 154(b) by 617 days.

(21) Appl. No.: 14/677,712

(22) Filed: Apr. 2, 2015

(65) Prior Publication Data

US 2015/0286585 A1    Oct. 8, 2015

Related U.S. Application Data

(60) Provisional application No. 61/976,976, filed on Apr. 8, 2014.

(51) Int. Cl.
*G06F 12/14* (2006.01)
*G06F 21/79* (2013.01)

(52) U.S. Cl.
CPC ...... *G06F 12/1458* (2013.01); *G06F 12/1408* (2013.01); *G06F 21/79* (2013.01); *G06F 2212/1052* (2013.01)

(58) Field of Classification Search
CPC .. G06F 12/1425; G06F 13/1605; G06F 8/665; G06F 9/30043; G06F 11/2097; G06F 12/1458; H04L 9/0643
USPC ............................................... 726/34; 100/1
See application file for complete search history.

(56) References Cited

U.S. PATENT DOCUMENTS

| | | | |
|---|---|---|---|
| 6,317,836 B1 | 11/2001 | Goren et al. | |
| 2002/0166061 A1* | 11/2002 | Falik | G06F 12/1425 726/34 |
| 2004/0205314 A1 | 10/2004 | Babudri et al. | |
| 2007/0061581 A1* | 3/2007 | Holtzman | G06F 21/78 713/176 |
| 2007/0245142 A1 | 10/2007 | Rios et al. | |
| 2010/0218064 A1* | 8/2010 | Ito | G06F 11/1068 714/746 |
| 2012/0179860 A1 | 7/2012 | Falange et al. | |
| 2012/0191924 A1 | 7/2012 | Iaculo et al. | |
| 2013/0019058 A1 | 1/2013 | Caraccio et al. | |
| 2014/0223087 A1 | 8/2014 | Caraccio et al. | |
| 2015/0100744 A1 | 4/2015 | Mirichigni et al. | |

FOREIGN PATENT DOCUMENTS

| | | |
|---|---|---|
| CN | 101120352 | 2/2008 |
| CN | 101273363 | 9/2008 |

(Continued)

OTHER PUBLICATIONS

MMC Linux Enablement, Micron, 2013.

(Continued)

*Primary Examiner* — Ashokkumar B Patel
*Assistant Examiner* — William B Jones
(74) *Attorney, Agent, or Firm* — Fletcher Yoder, P.C.

(57) ABSTRACT

A device includes a memory. The device also includes a controller. The controller includes a register configured to store an indication of whether an ability of a received command to alter an access protection scheme of the memory is enabled. The received command may alter the access an access protection scheme of the memory responsive to the indication.

27 Claims, 5 Drawing Sheets

(56) References Cited

FOREIGN PATENT DOCUMENTS

| CN | 102460405 | 5/2012 |
|----|-----------|--------|
| JP | 2003005047 | 1/2003 |
| JP | 2004086353 | 3/2004 |
| JP | 2007172062 | 7/2007 |
| JP | 2013069250 | 4/2013 |
| JP | 2013516003 | 5/2013 |
| TW | 201104439 | 2/2011 |
| WO | 2011081890 | 7/2011 |

OTHER PUBLICATIONS

Taiwanese Office Action for TW Application No. 104111172 dated Dec. 3, 2015; 12 Pages.

EP Application No. 15776594 Extended European Search Report dated Feb. 23, 2017; 7 Pages.

JEDEC "Jedec Standard Embedded Multi-Media Card (eMMC) Electrical Standard (5.0), JESD84-B50", Sep. 1, 2013 (Sep. 1, 2013), XP055344981, Retrieved from the Internet: URL:http://www.jedec.org/sites/default/files/docs/JESD84-B50.pdf [retrieved on Feb. 13, 2017], 296 Pages.

CN Application No. 201580026600.8 Office Action dated Feb. 2, 2019, 8 pgs.

ETSI SCP, Reply LS on High Speed UICC Interface,3GPP TSG-CT#33 CP-0 60497, Sep. 22, 2006, Chapter 7.1, Fig. 3, [online], Internet <URL:http://www.3gpp.org/ftp/tsg_ct/TSG_CT/TSGC_33/Tdocs/CP-060497.zip>, 3 pgs.

JP Application No. 2016-560958 Office Action dated Apr. 23, 2019, 12 pgs.

JP Application No. 2016-560958 Office Action dated Jan. 7, 2020, 10 pgs.

* cited by examiner

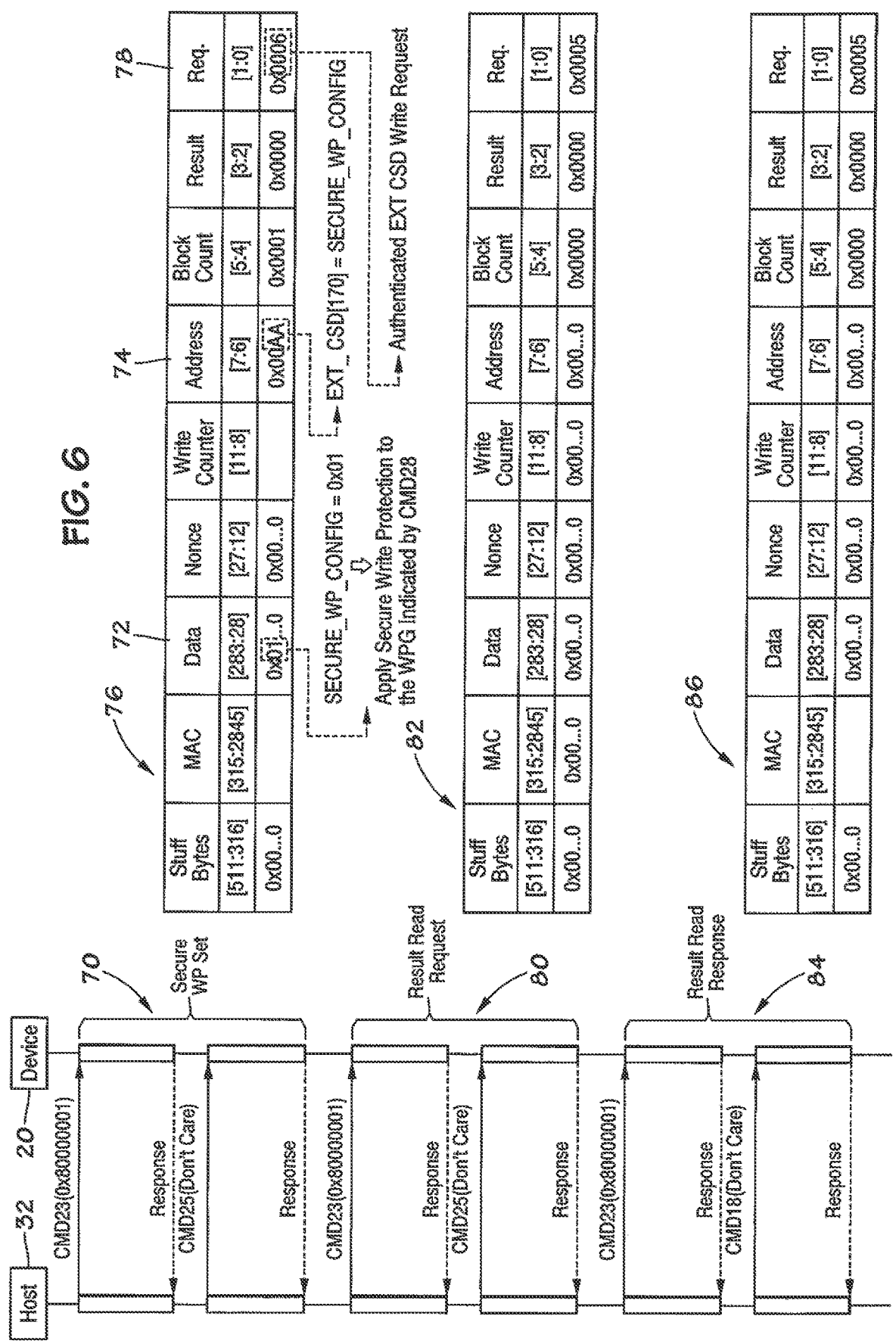

APPARATUSES AND METHODS FOR SECURING AN ACCESS PROTECTION SCHEME

CROSS REFERENCE TO RELATED APPLICATIONS

This application is a Non-Provisional application claiming priority to U.S. Provisional Patent Application No. 61/976,976, entitled "Authenticated Configuration Registers for Secure Write/Erase Protections", filed Apr. 8, 2014, which is herein incorporated by reference.

BACKGROUND

Field of Invention

Embodiments relate generally to apparatuses such as electronic circuits, devices and systems and, more specifically, in certain embodiments, to securing access protection schemes in embedded memory devices.

Description of Related Art

In the field of computing, the size of a device and speed at which that device operates continues to remain at the forefront of development. Accordingly, different techniques and systems that employ embedded memory devices have become more prevalent. One such embedded memory device is an embedded Multimedia card (eMMC) that includes Multimedia card (MMC) components (e.g., an MMC interface, memory such as flash memory, and an associated controller) integrated into a package, such as a ball grid array (BGA) package. In operation, the eMMC devices may be utilized to simplify and/or perform particular tasks for a host (e.g., tablets, smart phones, GPS devices, electronic reading devices, and other portable computing devices). These tasks may include boot operations and/or other operations that may be offloaded to the eMMC. Moreover, as the overall physical size of the eMMC is compact, use of an eMMC in portable electronics allows for additional processing capability as well as a potential increase in available area in the device for additional components (i.e., due to the relative compact size of the eMMC in view of the additional processing provided to the host). Additional advantages gained by using eMMC include a reduced need for a host processor to specifically manage, for example, non-volatile (e.g., flash) memory since that memory may be integrated into the eMMC and managed by the controller integrated into the eMMC.

Current eMMC devices implement certain schemes to protect portions (e.g., memory locations) of the eMMC from being accessed (e.g., erased, read and/or written). These protection schemes may provide, for example, device level write protection whereby the entire device (inclusive of, for example, boot partitions, a general purpose area partition, a replay protected memory block, a user/enhanced user data area partition, or the like) may be protected from one or more types of access operations (e.g., write/erase). This protection of the entire device may be accomplished via setting of permanent or temporary write protect bits in a card specific data (CSD) register. Additionally, current eMMC devices may allow for specific portions (e.g., write protection (WP) groups or high capacity WP groups) of the eMMC to be permanently, power-on, or temporarily write protected, whereby the WP group may be the smallest unit which may have individual write protection and its size may be fixed for each eMMC device. Additionally current eMMC devices may allow for boot location write protection that allows for multiple (e.g., two) boot partitions of a given eMMC to be singularly or collectively permanently/power-on write protected via setting a specific field in the CSD register.

However, a potential problem exists for current eMMC devices. The configuration of the current access protection schemes discussed above may not be secured. That is, current eMMC devices may be unable to prevent an unauthorized entity from altering an access protection scheme(s) of the eMMC device. As such, there is a need to prevent unauthorized configuration of an access protection scheme(s) of the eMMC device.

BRIEF DESCRIPTION OF DRAWINGS

FIG. 6 illustrates an example of message types transmitted between the host of FIG. 3 and the embedded storage device of FIG. 3, according to various embodiments.

DETAILED DESCRIPTION

Present embodiments include apparatuses and methods for securing an access protection scheme, such as only allowing at least a portion of a configuration register (e.g., a register set of data holding places or memory that holds configuration data/information) to be set, cleared and/or read after successful completion of an authentication technique. For example, the authentication technique, in one embodiment, may allow an access protection scheme(s) of an embedded memory device to be altered only in response to commands received from a trusted host system. The authentication technique may further be based on a cryptographic key pre-programmed into the embedded memory device, such as one that was programmed during the manufacturing phase of the embedded memory device.

Figure 1:
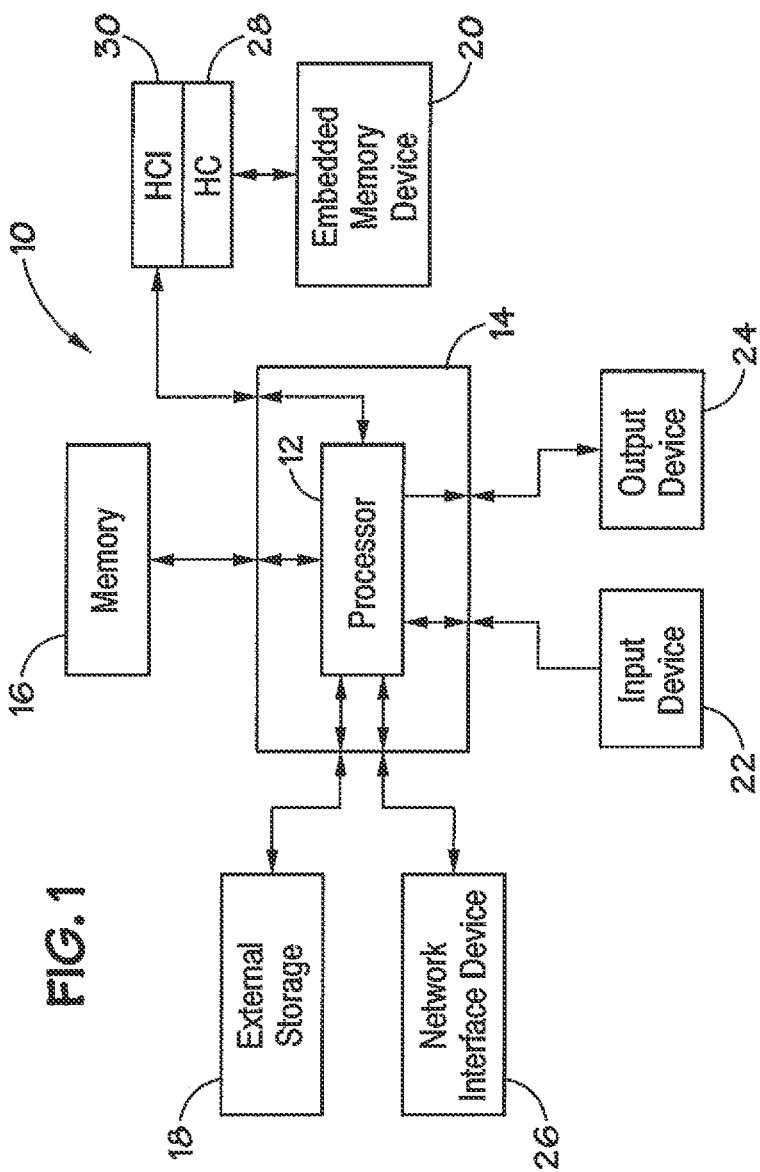
FIG. 1 illustrates an example of system including an embedded storage device, according to various embodiments.

Turning now to the figures, FIG. 1 illustrates an embodiment of an apparatus in the form of a processor-based system, generally designated by reference numeral 10. The system 10 may be any of a variety of types of electronic devices, such as a laptop computer, tablet, portable phone, personal organizer, personal digital media player, camera, electronic reader, etc. The system 10 may be some other sort of electronic device, such as a copier, a scanner, a printer, a game console, a television, a set-top video distribution or recording system, a cable box, a factory automation system, an automotive computer system, or a medical device. The terms used to describe these various examples of systems, like many of the other terms used herein, may share some referents and, as such, should not be construed narrowly in virtue of the other items listed.

In a processor-based device, such as the system 10, a processor 12, such as a microprocessor, controls the processing of system functions and requests in the system 10. Further, the processor 12 may comprise a plurality of processors that share system control. The processor 12 may be coupled directly, indirectly, or a combination thereof to each of the elements in the system 10, such that the processor 12 controls the system 10 by executing instructions that may be stored within the system 10 or external to the system 10.

In one embodiment, the processor 12 may be directly coupled to elements in the system 10 via a system bus 14. System bus 14 may allow for data and or commands to be routed between the processor 12 and various elements in the system 10, as well as provide a path for data and or commands to be routed amongst the various elements in the system 10. Examples of the various elements of the system 10 are provided below.

As will be appreciated, the system 10 may include memory 16. The memory 16 may include volatile memory, such as Dynamic Random Access Memory (DRAM), Static Random Access Memory (SRAM), Synchronous DRAM (SDRAM), Double Data Rate DRAM (DDR SDRAM), DDR2 SDRAM, DDR3 SDRAM, etc. The memory 16 may also include non-volatile memory, such as read-only memory (ROM), PC-RAM, silicon-oxide-nitride-oxide-silicon (SONOS) memory, metal-oxide-nitride-oxide-silicon (MONOS) memory, polysilicon floating gate based memory, and/or other types of flash memory of various architectures (e.g., NAND memory, NOR memory, etc.) to be used in conjunction with the volatile memory. The memory 16 may include one or more memory devices, such as DRAM devices, solid state drives (SSD's), MultimediaMediaCards (MMC's), SecureDigital (SD) cards, CompactFlash (CF) cards, or any other suitable device. Further, it should be appreciated that such memory devices may couple to the system 10 via any suitable interface, such as Universal Serial Bus (USB), Peripheral Component Interconnect (PCI), PCI Express (PCI-E), Small Computer System Interface (SCSI), IEEE 1394 (Firewire), or any other suitable interface. To facilitate operation of the memory 16, such as the flash memory devices, the system 10 may include a memory controller (not illustrated). As will be appreciated, the memory controller may be an independent device or it may be integral with the processor 12 or the memory 16. Additionally, the system 10 may include an external storage 18, such as a magnetic storage device. Additionally, in some embodiments, additional storage (e.g., embedded memory device 20) may be utilized in addition to or in place of memory 16.

The system 10 may include a number of additional elements. For instance, an input device 22 may also be coupled to the processor 12 to allow a user to input data into the system 10. For instance, an input device 22 may be used to input data into the memory 16 for later analysis by the processor 12. The input device 22 may include buttons, switching elements, a keyboard, a light pen, a stylus, a mouse, and/or a voice recognition system, for instance. Additionally, an output device 24 may be present in the system 10. The output device 24 may include, for example, a display. The output device 24 may include an LCD, a CRT, LEDs, and/or an audio display, for example. They system may also include a network interface device 26, such as a Network Interface Card (NIC), for interfacing with a network, such as the Internet. As will be appreciated, the system 10 may include many other components, depending on the application of the system 10.

Additionally, as noted above, the system 10 may include an embedded memory device 20. One example of this embedded memory device 10 is an embedded Multimedia card (eMMC) that includes Multimedia card (MMC) components (e.g., an MMC interface, memory such as flash memory, and an associated controller on a common die) integrated into a ball grid array (BGA) package. In operation, the eMMC devices may be utilized to simplify and/or perform particular tasks for the system, such as boot operations and/or other operations that may be offloaded to the eMMC to allow the processor greater freedom to operate on other matters. Moreover, offloading of particular operations to be performed by the eMMC may allow for faster completion of the tasks, since the eMMC may operate in parallel with the processor 12.

In some embodiments, the device 20 may interface with a host controller 28. Additionally, a host controller interface 30 may allow for communication to be completed between the device 20 and the processor 12 (via system bus 14). The operation of the host controller 28 and the host controller interface 30 will be discussed in greater detail below, with respect to FIG. 2.

Figure 2:
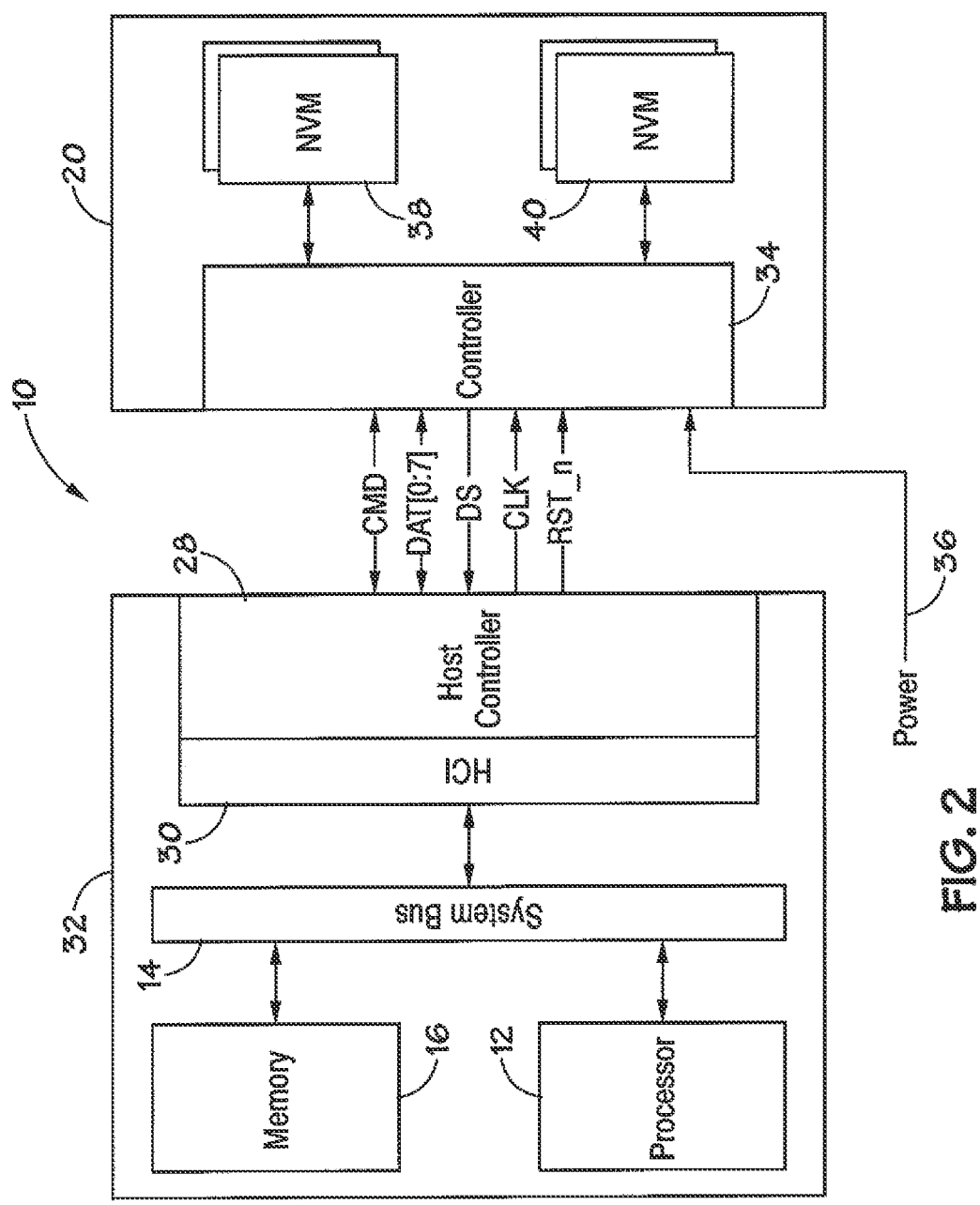
FIG. 2 illustrates a more detailed view of the system of FIG. 1 having a host and the embedded storage device of FIG. 1, according to various embodiments.

FIG. 2 illustrates the device 20, as well as the interconnection of the device 20 with additional elements of the system 10, in greater detail. As illustrated, the processor 12, the system bus 14, the memory 16, the host controller 28, and the host controller interface 30 may make up a host 32. The host 32 may communicate with the device 20. For example, commands may be transmitted along a command path (e.g., CMD) between the host 32 and the device 20. Additionally, in some embodiments, responses may be transmitted along the bi-directional CMD from the device 20 to the host. Likewise, data may be transmitted along a data path (e.g., DAT[0:7]) that may include a plurality of route lines between the host 32 and the device 20. Similarly, a data strobe may be transmitted along a data strobe path (e.g., DS) from the device 20 to the host 32. Further, clock signals may be transmitted along a clock path (e.g., CLK) and reset signals may be transmitted along a reset signal path (e.g., RST_n) between the host 32 and the device 20. More specifically, connectors (e.g., pins, leads, or the like) may be present in the host 32 (e.g., coupled to the host controller 28) and may be coupled to each of the command path, data path, data strobe path, clock path, and reset signal path, respectively. Likewise, connectors (e.g., pins, leads, or the like) may be present in device 20 (e.g., coupled to device controller 34) and may be coupled to each of the command path, data path, data strobe path, clock path, and reset signal path, respectively. Additionally, in some embodiments, a power path 36 may provide one or more power signals to provide power to the various elements of the device 20. In some embodiments, these power signals may be received at one or more connectors (e.g., pins, leads, or the like) present in the device 20 (e.g., coupled to the device controller 34).

In some embodiments, the device controller 34 may disperse the power signals to the various elements of the device 20 (e.g., to the device controller 34, to the non-volatile memory 38, to the non-volatile memory 40, and to additional elements of the device 20 not presently illustrated). Additionally, the device controller 34 may receive commands along the command path, which may include signals to be interpreted by the device controller 34. These command signals may be instructions that direct the memory device 20 to operate in certain manners (e.g., read data, write data, protect areas of memory from being overwritten, etc.). Likewise, the device controller 34 may receive data along the data path, which may include data signals to be stored by the device controller 34. It should be further noted that the device controller 34 may also operate to transmit one or more of command signals and/or data signals back to the host 32 during the operation of the device 20.

The device controller 34 may further transmit data strobe signals to the host 32 to be utilized, for example, by the host 32 during a read operation whereby data is being transferred from the device 20 to the host 32. Likewise, the device controller 34 may receive clock and/or reset signals, to be used in conjunction with, for example, read/write operations performed by the device 20 and to initialize (e.g., reset) the device 20, respectively.

As previously discussed, the device 20 may be an eMMC device and, as such, may implement certain access protection schemes, such as a write protection scheme(s) to protect one or more portions (e.g., memory locations) of the eMMC from being overwritten. These protection schemes may provide, for example, device level write protection or specific portion (e.g., write protection (WP) groups or high capacity (HC) WP groups) protection either permanently, during power-on, or temporarily. Additionally, boot partition write protection may be provided to allow for, for example, multiple (e.g., two) boot partitions of a given eMMC to be singularly or collectively permanently/power-on write protected.

However, these protection schemes applicable in conjunction with the system 10 of FIG. 2 may be insufficient to prevent, for example, unauthorized alteration of the write protection schemes described above. As such, additional techniques may be employed to reduce the opportunity for and/or prevent unauthorized alteration of access protection schemes.

Figure 3:
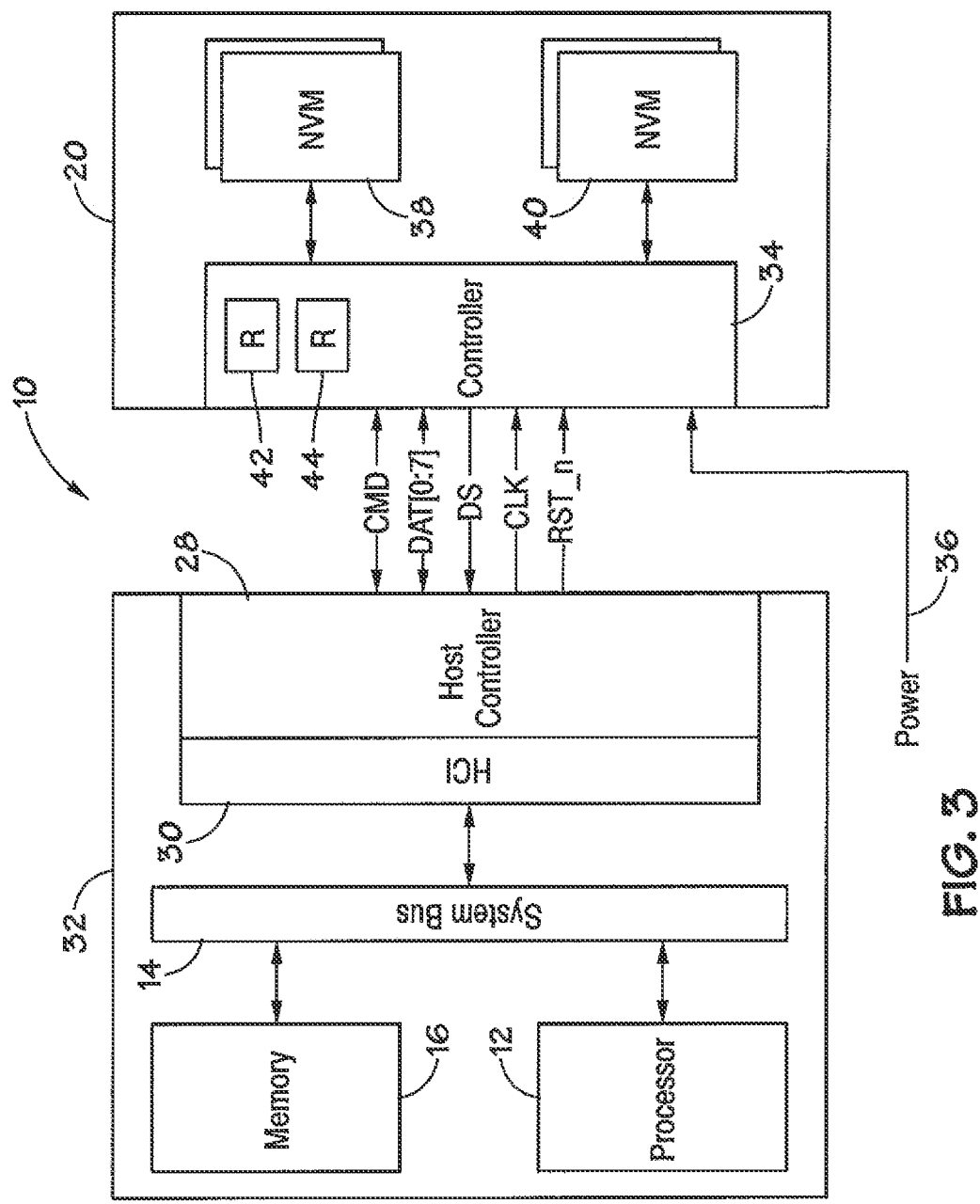
FIG. 3 illustrates a second detailed view of the system of FIG. 1 having a host and the embedded storage device of FIG. 1, according to various embodiments.

FIG. 3 illustrates the device 20 and the host 32 of a system 10 that may reduce/eliminate unauthorized alteration of the access protection schemes of the device 20. As illustrated, the device 20 (e.g. an eMMC device) may include two additional registers 42 and 44 and/or or two dedicated fields in a generic configuration register (e.g. an extended card specific data register of an eMMC device) which are accessible only after successful completion of an authentication process (e.g., a process that determines whether an access attempt or other received signal or transmission packet or the like has been properly issued from a valid, e.g., authorized, sender and is an authorized, e.g., valid, access attempt, signal, transmission, or the like). In some embodiments, data stored in registers 42 and 44 may be selectively alterable (e.g., altered when a request has been authenticated as valid) and control whether a respective protection scheme(s) of the device 20 may be altered. In some embodiments, the registers 42 and 44 may each be related to control of write protection of a particular portion of the device 20. For example, the register 42 may be utilized to selectively allow alteration of any write protection of WP groups or HC WP groups (e.g., stored in non-volatile memory 38). Similarly, for example, the register 44 may be utilized to selectively allow alteration of any write protection of any boot partitions of the device 20 (e.g., stored in non-volatile memory 40).

Figure 4:
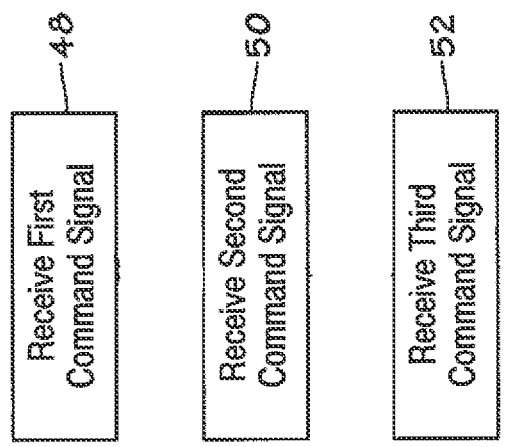
FIG. 4 illustrates a method of accessing a first portion of the embedded storage device of FIG. 3, according to various embodiments.

FIG. 4 illustrates three examples of commands 46 that may be received by the device 20 that may affect (e.g., alter) the register settings of registers 42 and/or register 44 when received from an authenticated sender. In one embodiment, these register settings (e.g., the secured access protection schemes of the device 20 including a configuration of an access protection scheme [e.g., a write protection mode] at the WP group or HC WP group level) may be persistent with respect to power cycles and/or hard resets of the device 20. For example, the access protection scheme at the WP group or HC WP group level is persistent such that the mode not be altered when power is cycled to the device 20 and/or when the device 20 is reset (e.g., via a reset signal on the reset signal path).

FIG. 4 illustrates receipt of a first command 48 signal that is utilized to set a secure WP mode (e.g., the write protection status can only be altered through an authenticated access). This includes, for example, the reception of the first command signal 48 transmitted from the host 32 to the device 20 along the command signal path. This command signal 48 may, for example, be termed a "CMD28" signal and may operate to set the temporary write protection of an addressed WP group. Second command signal 50 may clear the secure WP mode. The second command signal 50 may also be transmitted from the host 32 and received by the device 20 along the command signal path. The second command signal 50 may, for example, be termed a "CMD29" signal and may operate to clear a temporary write protection of an addressed WP group. Likewise, third command signal 52 may be utilized to check the WP protection. The third command signal 52 may also be transmitted from the host 32 and received by the device 20 along the command signal path. This third command signal 52 may, for example, be termed a "CMD31" signal and may operate to provide the status of the access protection scheme of a set of WP groups, beginning with the WP group addressed.

In one embodiment, receipt and analysis of any one of the commands 48, 50, and 52 may be accomplished by introducing one or more additional fields (e.g., register locations) to an extended card specific data (CSD) register of the device 20. This extended CSD register may, for example, be a register associated with (e.g., located in) the device controller 34 and may store configuration information of the device 20. Additionally, these additional fields of the extended CSD register may be generally illustrated as the register 42 of FIG. 3. One new field in the register 42, which may be a first additional field of the extended CSD register, may, for example, allow alteration of the conventional behavior of the device 20 with respect to receiving a CMD28 signal in order to set temporary write protection at the WP group level. For example, a first indication (e.g., a first value) in this first additional field could be used to indicate the enabling of set secure write protection (e.g., the enabling of an ability of an issued/received CMD28 to set a secure write protection to an addressed WP group). Meanwhile, a second indication (e.g., a second value) in this first additional field could be used to indicate the disabling of set secure write protection (e.g., the disabling of an ability of an issued/received CMD28 to set a secure write protection to an addressed WP group).

A second additional field in the register 42, which may also be a portion of the extended CSD register, may allow alteration of the conventional behavior of the device 20 with respect to receiving a CMD29 signal in order to clear temporary write protection at the WP group level. For example, a first indication (e.g., a first value) in this second additional field may be used to indicate the enabling of clear secure write protection (e.g., the enabling of an ability of an issued/received CMD29 to clear a secure write protection of an addressed WP group). That is, if the addressed WP group was temporarily write protected, the issued/received CMD29 may clear the protection when the first indication is present in the second additional field. Meanwhile, a second indication (e.g., a second value) in this second additional field coupled may be used to indicate the disabling of clear secure write protection (e.g., the disabling of the ability of an issued/received CMD29 to clear a secure write protection of an addressed WP group). For example, when the second indication is present, the issued/received CMD29 may not operate to clear the protection (until after, for example, a successful completion of an authentication process). Accordingly, the relevant authentication process is performed to determine whether the settings of register 42 may be altered, thus effecting what action is taken in response to a received CMD28, CMD29, and/or CMD31.

A distinct process may be utilized to allow for selective write protection of boot partitions of the device 20 (e.g., which may be located in non-volatile storage 40). This process may be executed by a controller executing a program including instructions stored in memory (e.g., non-volatile memory 38 or memory 16). Additionally, this secure write protection mechanism may be persistent with respect to power cycles and/or hard resets of the device 20.

For example, one or more additional fields (e.g., register locations) may be included in the extended CSD register of the device 20. These additional fields of the extended CSD register may be generally illustrated as the register 44 of FIG. 3. In one embodiment, one or more boot access commands (which may be a particular example of a command similar to one or more of CMD28, CMD29, and/or CMD31) transmitted from the host 32 to the device 20 along the command signal path may be utilized to set the additional fields (e.g., locations) to particular values (once the validity of the signals and/or sender has been authenticated). These boot access commands may (subsequent to a successful completion of an authentication process) operate to, for example, set a first field of the register 44 to a first value to indicate that the boot partition(s) are not secure write protected (e.g., disable write protection of the boot partition(s)). The boot access commands may instead (subsequent to a successful completion of an authentication process) operate to, for example, set the first field of the register 44 to a second value to indicate that the boot partition(s) are secure write protected (e.g., enable write protection of the boot partition(s)). Similarly, the boot access commands may (once authorized) operate to, for example, set a second field of the register 44 to a first value to indicate that the write protection (or lack thereof) of the first field of the register 44 is applied to a first boot partition. Likewise, the boot access commands may (once authorized) operate to, for example, set the second field of the register 44 to a second value to indicate that the write protection (or lack thereof) of the first field of the register 44 is applied to a second boot partition.

Additionally, the boot access commands (once authorized) may operate to, for example, set a third field of the register 44 to a first value to indicate the host 32 is authorized to set (e.g., alter) the first field of the register 44 or set the third field of register 44 to a second value to indicate that the host 32 is not authorized to set (e.g., alter) the first field of the register 44 (e.g., the second value in the third field of register 44 indicates that the ability of the host 32 to alter the first field of the register 44 is disabled). Furthermore, in some embodiments, the boot access commands may operate (once authorized) to, for example, set a fourth field of register 44 to a first value to indicate the first field of the register 44 applies to multiple partitions of the boot region and set the fourth field of register 44 to a second value to indicate the first field of the register 44 applies only to the boot partition selected in the second field of the register 44. Additionally, it should be particularly noted that in some embodiments, once device 20 has been set to allow protection on the boot partitions separately (fourth field, second value) this setting will not be reverted in response to a power cycle.

Additionally, one or more fields of register 44 may indicate (e.g., allow for a check, for example, by host 32 to determine) whether multiple portions of a boot region (e.g., boot area 1 and boot area 2) are securely protected as well as the level of protection. For example, a fifth field of register 44 may store a first value to indicate boot area 1 is securely write protected (e.g., its write protection status can only be altered through an authenticated access whereby a register configuration must be authenticated before the write protection status of the boot area can be altered). Similarly, the fifth field of register 44 may store a second value to indicate boot area 1 is permanently write protected (e.g., against both power cycles and reset signals). Additionally, the fifth field of register 44 may store a third value to indicate boot area 1 is power on protected (e.g., its write protection status may not be altered when power is cycled to the device 20) and may store a fourth value to indicate boot area 1 is not write protected (e.g., can be written to).

Similarly, for example, a sixth field of the register 44 may store a first value to indicate boot area 2 is securely write protected (e.g., its write protection status can only be altered through an authenticated access whereby a register configuration must be authenticated before the write protection status of the boot area can be altered) and may store a second value to indicate boot area 2 is permanently write protected (e.g., against both power cycles and reset signals). Additionally, the sixth field of the register 44 may store a third value to indicate boot area 2 is power on protected (e.g., its write protection status may not be altered when power is cycled to the device 20) and may store a fourth value to indicate boot area 2 is not write protected (e.g., can be written to). It may be appreciated that indications of the values stored in the fifth and sixth fields of register 44 may be transmitted to the host 32 in response to a check on the write protection status of the respective boot region of device 20.

As previously discussed, the secure write protection of the device 20 may include securing the ability to alter the write protection of the device 20 so that, for example, only the host 32 (or other authorized party) has access to alter the configuration of access protection of the device. This may be accomplished via an authentication technique. This authentication technique may be executed, for example, by a controller executing a program including instructions stored in memory (e.g., non-volatile memory 38 and/or memory 16).

For example, the associated actions performed via CMD28 and CMD29 discussed above with respect to FIG. 4 may be accomplished subsequent to authentication of the sender of the commands CMD28 and CMD29 and/or subsequent to authentication of the validity of the commands CMD28 and CMD29 themselves. It may be appreciated that this authentication technique may utilize cryptography keys, message authentication code (MAC) (e.g., tokens), handshaking, and/or other techniques to confirm that the CMD28 and CMD29 are received from an authorized user. Likewise, the authentication technique utilizing cryptography keys, MAC, handshaking, and/or other techniques may be applied to allow for the setting of the register 44 to allow/disable write protection of the boot partitions (boot portions) of the device 20. In some embodiments, the authentication technique may be based on and/or utilize a secure hash algorithm (SHA), such as the SHA-256 algorithm.

In some embodiments, the device 20 may include a replay protected memory block (RPMB) area. This RPMB may allow a portion of memory to be accessed only via a security key or trusted security function that may be, for example, included as part of the device 20 when manufactured. The present authentication technique may include, for example, extending existing RPMB protocols of, for example, an eMMC device to include additional procedures. For example, these procedures may include authenticating a sender of CMD28 and CMD29 to allow the commands to be applied. Likewise, the procedures may include authenticating a sender of any command, for example, to set register 44 to allow/disable write protection of the boot partitions (boot portions) of the device 20. More specifically, in some embodiments, the procedures may include an authenticated secure WP configuration and boot secure WP set/clear request/response and an authenticated secure WP configuration and boot secure WP read request/response.

Functionalities that may be attained through the use of the authentication technique may include, for example, enabling or disabling the ability to alter (e.g., set or clear) write protection of an addressed group responsive to a command (e.g., CMD28 or CMD29). Furthermore, functionalities that may also be additionally attained through the use of the authentication technique may include, for example, enabling or disabling the ability to read a particular extended CSD field (e.g., in register 42 or 44).

Figure 5:
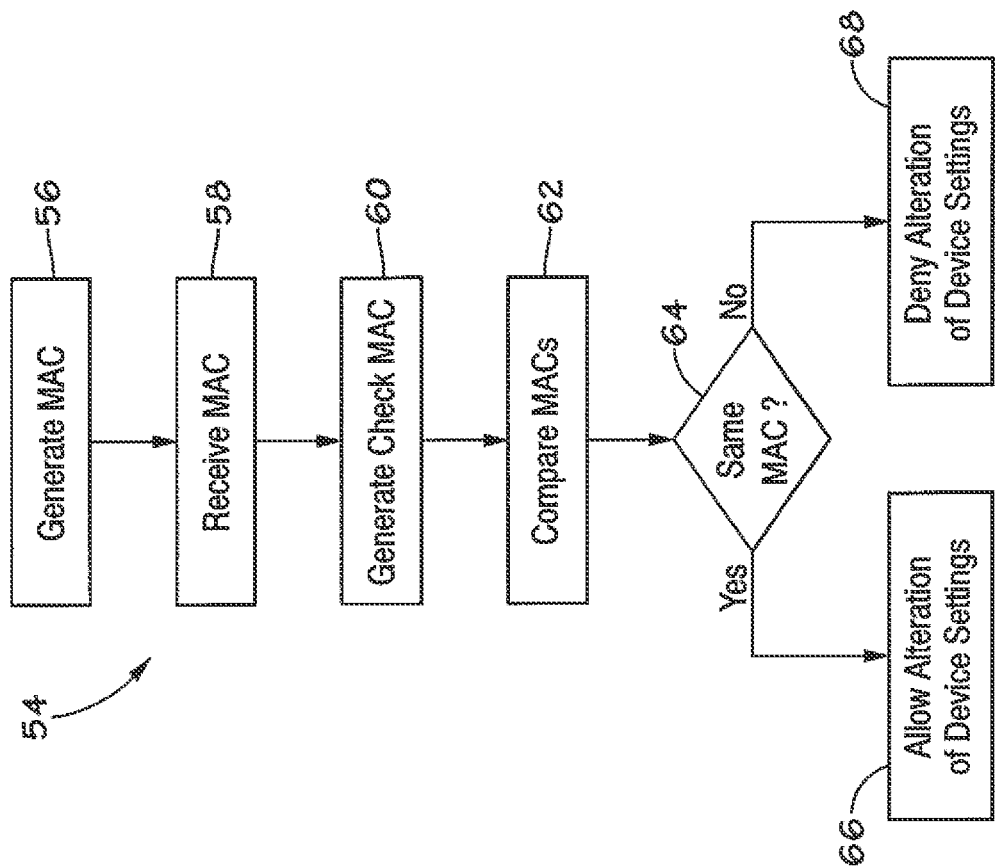
FIG. 5 illustrates a method of authenticating access of the embedded storage device of FIG. 3, according to various embodiments.

FIG. 5 illustrates an example of the process 54 of the authentication technique that may be executed, for example, by a controller (e.g., the device controller 34 or a controller integral with processor 12) executing a program including instructions stored in memory (e.g., non-volatile memory 38 or memory 16). The process 54 details the process of attempting to access the RPMB, for example, to alter the write protection settings of the device 20. In step 56, the accessing party (e.g., the host 32) reads a counter value to generate a MAC (token) using, for example, a SHA-256 algorithm. The generated MAC, from step 56, is transmitted to and received by the device 20 (e.g., the device controller 34 of device 20) in step 58. The device controller 34 may read its key which may, for example, be pre-loaded during manufacturing of the device 20, as well as the counter value and, in step 60, generate a check MAC using, for example, the SHA-256 algorithm. The device controller 34 may then, in step 62, compare the two MACs. If the MACs match, RPMB access is allowed in step 64 and write protection altering commands (e.g., CMD28 and CMD29 received in conjunction with the generated MAC or a respective boot access command) will be allowed to alter the write protection of the device 20 in step 66. Otherwise, if the MACs don't match, the device 20 will not respond to any write protection altering commands (e.g., CMD28 and CMD29 or a respective boot access command) in step 68.

In some embodiments, new RPMB request and response opcodes to introduce authenticated accesses to, for example, the extended CSD fields (e.g., in registers 42 and/or 44) may be established. However, the authenticated accesses may also be applied to other structures (not necessarily an extended CSD). For example, in the table set forth below, request message types "Authenticated EXT CSD write request" and "Authenticated EXT CSD read request" may be additional request opcodes that introduce authenticated accesses to the Extended CSD fields discussed above. Similarly, request message types "Authenticated EXT CSD write response" and "Authenticated EXT CSD read response" may be additional response opcodes that introduce authenticated accesses to the Extended CSD fields discussed above.

TABLE 1

| Request Message Types | |
|---|---|
| 0x0001 | Authentication key programming request |
| 0x0002 | Reading of the Write Counter value-request |
| 0x0003 | Authenticated data write request |
| 0x0004 | Authenticated data read request |
| 0x0005 | Result read request |
| 0x0006 | Authenticated EXT CSD write request |
| 0x0007 | Authenticated EXT CSD read request |
| Response Message Types | |
| 0x0100 | Authentication key programming response |
| 0x0200 | Reading of the Write Counter value-response |
| 0x0300 | Authenticated data write response |
| 0x0400 | Authenticated data read response |
| 0x0600 | Authenticated EXT CSD write response |
| 0x0700 | Authenticated EXT CSD read response |

FIG. 6 illustrates one example of the request message types in conjunction with a CMD28 to set a secure write protection of device 20. More particularly, FIG. 6 illustrates a secure WP request from host 32 to device 20. This request may include, for example, a request to apply secure write protection to a WP group (e.g., the write protection status can only be altered through an authenticated access) indicated by the CMD28 (as illustrated in the data 72 and address 74 fields of the RPMB request 76). Additionally, the RPMB request 76 may include a request field 78 that includes the Authenticated EXT CSD write request of Table 1 above. This Authenticated EXT CSD write request will, in some embodiments, operate as the request that will initiate the authentication technique described above.

Additionally, FIG. 6 illustrates a result read request 80 that may be, for example, initiated by the host 32 to determine whether the device 20 was correctly set in a proscribed access protection scheme. An example of the result read request 80 is illustrated as packet 82. Subsequent to receiving the result read request 80, the device 20 may issue a result read response 84 to host 32. This result read response 82 may include information related to whether the device 20 was correctly set in a proscribed access protection scheme. An example of the result read request 84 is illustrated as packet 86.

While various modifications and alternative forms are contemplated, specific embodiments have been shown by way of example in the drawings and have been described in detail herein. However, it should be understood that the embodiments are not intended to be limited to the particular forms disclosed. Rather, the embodiments are to cover all modifications, equivalents, and alternatives falling within the spirit and scope of the following appended claims. Moreover, it should be noted that terms such as "responsive to" may, in some embodiments, encompass temporal phrases/actions such as when, after, and/or the like as well as terms such as "based upon," or "based, at least in part, on" or the like.

What is claimed is:

1. An apparatus, comprising:
   a memory; and
   a controller configured to interpret a command received along a command path, wherein the controller is associated with a register, wherein the register is configured to store an indication of whether an access protection scheme of the memory is alterable, wherein the controller is configured to prevent alteration to the indication stored in the register until the command is authenticated as being properly issued from an authorized sender.

2. The apparatus of claim 1, wherein the controller is configured to authenticate the command by accessing a pre-loaded cryptographic key.

3. The apparatus of claim 2, wherein the controller is configured to authenticate the command by generating a message authentication code responsive to the pre-loaded cryptographic key.

4. The apparatus of claim 3, wherein the controller is configured to authenticate the command by comparing the generated message authentication code with a message authentication code associated with the command.

5. The apparatus of claim 4, wherein the controller is configured to allow access to at least a portion of the register responsive to the generated message authentication code matching the message authentication code associated with the command.

6. The apparatus of claim 5, wherein the controller is configured to allow access to at least a portion of the register via a command present in the command responsive to the generated message authentication code matching the message authentication code associated with the command.

7. The apparatus of claim 4, wherein the controller is configured to allow access to at least a portion of a configuration register of the apparatus responsive to the generated message authentication code matching the message authentication code associated with the command.

8. The apparatus of claim 1, wherein the memory and the controller are included in an embedded multimedia card (eMMC).

9. The apparatus of claim 1, wherein the access protection scheme protects write access or erase access of the memory.

10. The apparatus of claim 1, wherein a portion of the memory protected by the access scheme is configured to store boot partitions.

11. A tangible non-transitory machine readable medium configured to store instructions to:
receive a request to alter an access protection scheme of an embedded memory device;
generate a first message authentication code;
determine whether the first message authentication code is equivalent to a second message authentication code received as part of the request; and
allow alteration of the access protection scheme of the embedded memory device responsive to the first message authentication code matching the second message authentication code subsequent to alteration of a stored value in a register of the embedded memory indicative of whether the access protection scheme of the embedded memory device is alterable by the request responsive to the first message authentication code matching the second message authentication code.

12. The tangible non-transitory machine readable medium of claim 11, wherein the instructions comprise instructions to: access a pre-loaded key and generate the first message authentication code responsive to the pre-loaded key.

13. The tangible non-transitory machine readable medium of claim 11, wherein the instructions comprise instructions to: alter the access protection scheme of the embedded memory device via alteration of the stored value in the register of the embedded memory device only after the request is authenticated as being properly issued from an authorized sender.

14. The tangible non-transitory machine readable medium of claim 11, wherein the instructions comprise instructions to: alter a write protected portion of the embedded memory device responsive to the access protection scheme of the embedded memory device being altered.

15. The tangible non-transitory machine readable medium of claim 14, wherein the instructions comprise instructions to: alter write protected groups as the write protected portion of the embedded memory device responsive to the access protection scheme of the embedded memory device being altered.

16. The tangible non-transitory machine readable medium of claim 14, wherein the instructions comprise instructions to: alter boot partitions as the write protected portion of the embedded memory device responsive to the access protection scheme of the embedded memory device being altered.

17. An apparatus, comprising:
an embedded memory device; and
a host comprising a processor configured to generate a request to alter an access protection scheme of an embedded memory device, wherein the request comprises a message authentication code generated responsive to a cryptographic key associated with the embedded memory device, wherein the embedded memory device comprises a controller configured to interpret the request to alter the access protection scheme of the embedded memory device when the request has been authenticated to allow alteration of a stored value in a register of the embedded memory device indicative of whether the access protection scheme of the embedded memory device is alterable by the request.

18. The apparatus of claim 17, wherein the host is configured to transmit the request to the embedded memory device to alter the access protection scheme of the embedded memory device.

19. The apparatus of claim 17, wherein the host is configured to generate a command to configure a write protection mode of the embedded memory device as part of the request to alter the access protection scheme.

20. The apparatus of claim 19, wherein the host is configured to generate a second command to request a read of a register field that indicates a configuration of the write protection mode of the embedded memory device as part of a second request.

21. The apparatus of claim 17, wherein the host is configured to generate a command to enable or disable setting of the access protection scheme of the embedded memory device as part of the request.

22. The apparatus of claim 21, wherein the host is configured to generate a second command to request a read of a register field that indicates the setting of the access protection scheme of the embedded memory device as part of a second request.

23. The apparatus of claim 17, wherein the host is configured to generate a command to enable or disable clearing of the access protection scheme of the embedded memory device as part of the request.

24. The apparatus of claim 23, wherein the host is configured to generate a second command to request a read of a register field that indicates the clearing of the access protection scheme of the embedded memory device as part of a second request.

25. An apparatus, comprising:
a memory; and
a controller configured to receive a command, wherein the controller is configured to, responsive to authentication of the received command, alter a stored value in a register associated with the controller indicative of whether an access protection scheme of the memory is alterable, wherein the received command comprises a command to alter the access protection scheme of the memory.

26. The apparatus of claim 25, wherein the received command comprises a command to alter boot access of the memory, wherein the stored value of the register is alterable only after a request is authenticated as being properly issued from an authorized sender.

27. The apparatus of claim 25, wherein the received command comprises a command to alter boot partitions of the apparatus, wherein the stored value in the register is alterable only after a request is authenticated as being properly issued from an authorized sender.

* * * * *